E. G. PADDECK.
WIRE TYING MECHANISM FOR BALING PRESSES.
APPLICATION FILED JULY 21, 1917.
1,275,296.
Patented Aug. 13, 1918.
5 SHEETS—SHEET 2.
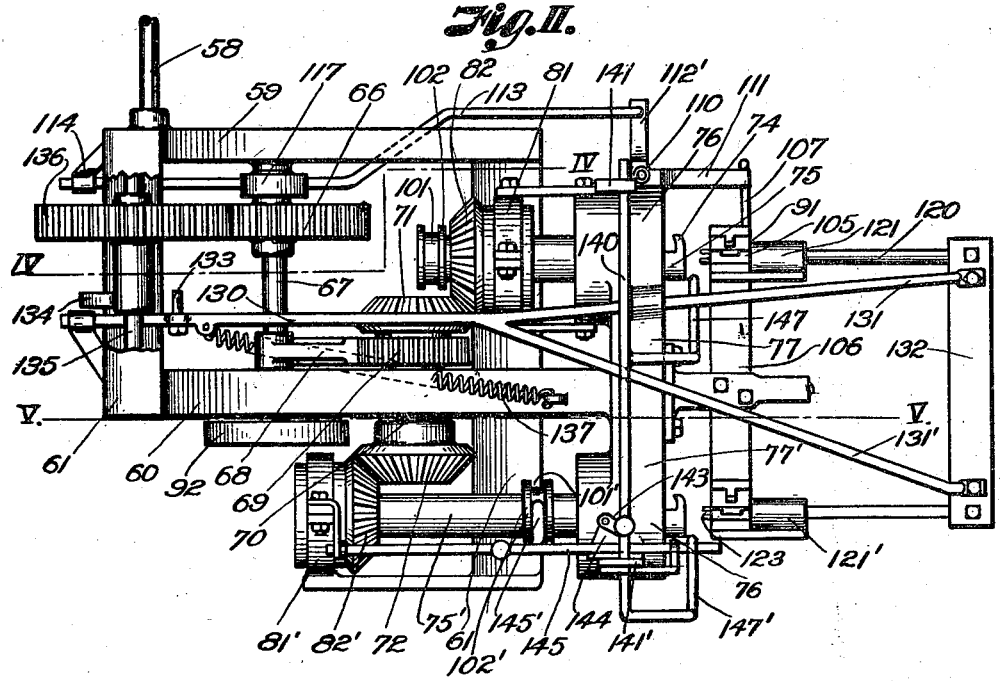
Fig. II.
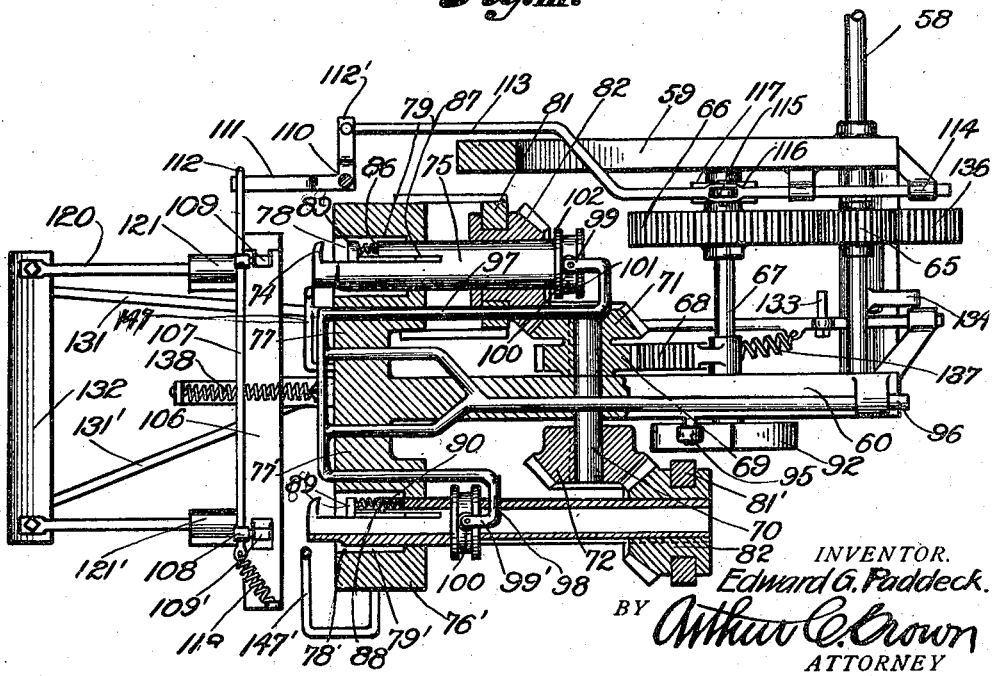
Fig. III.
INVENTOR.
Edward G. Paddeck.
BY Arthur C. Crown
ATTORNEY

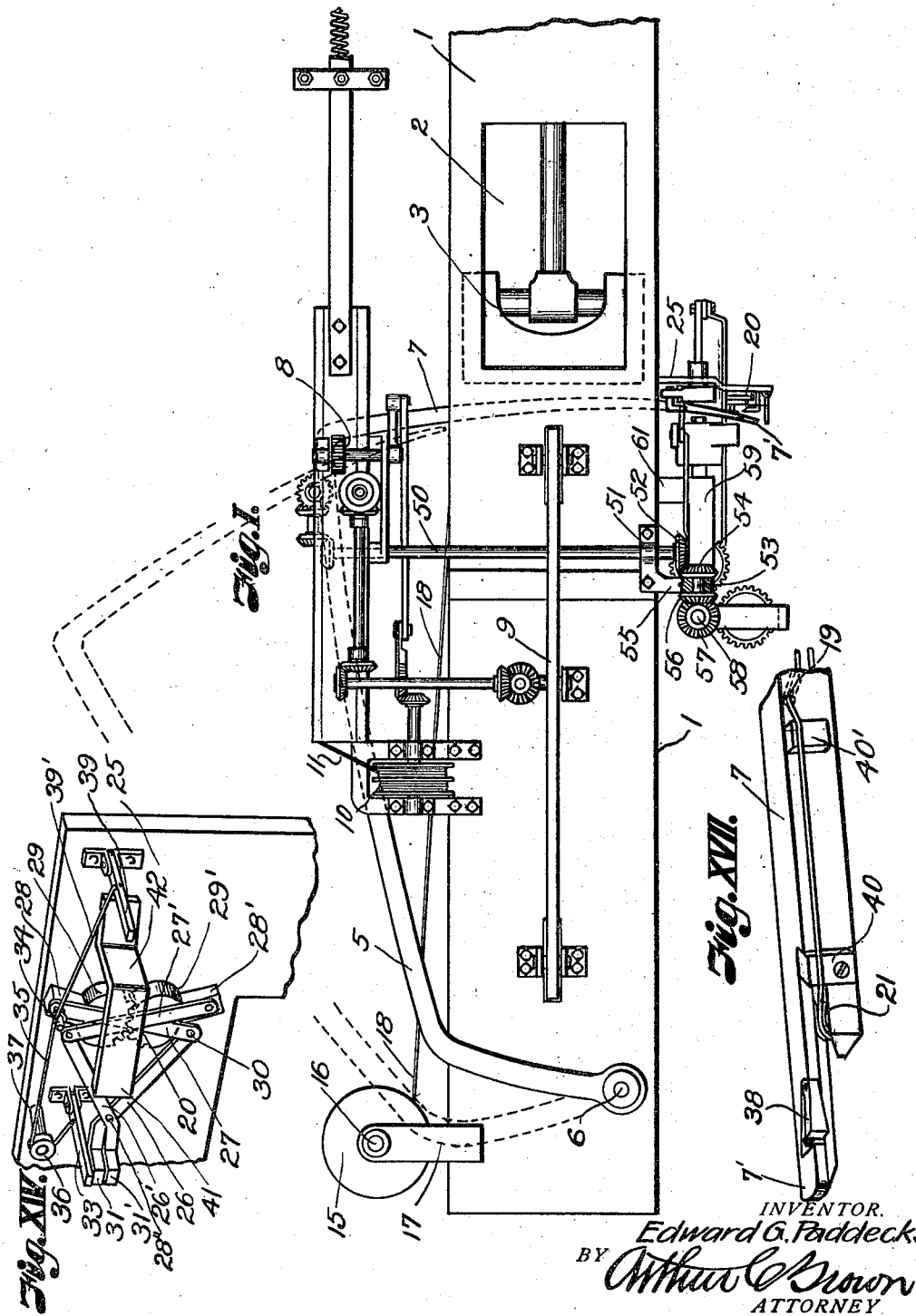

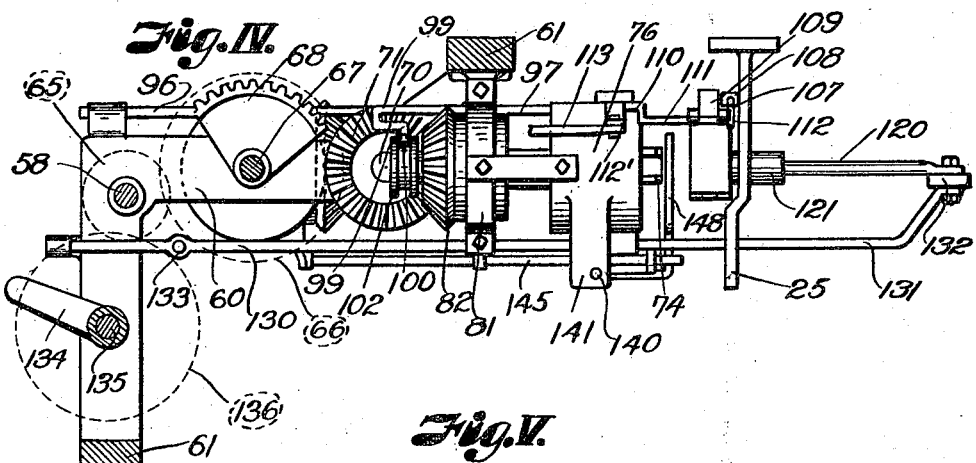
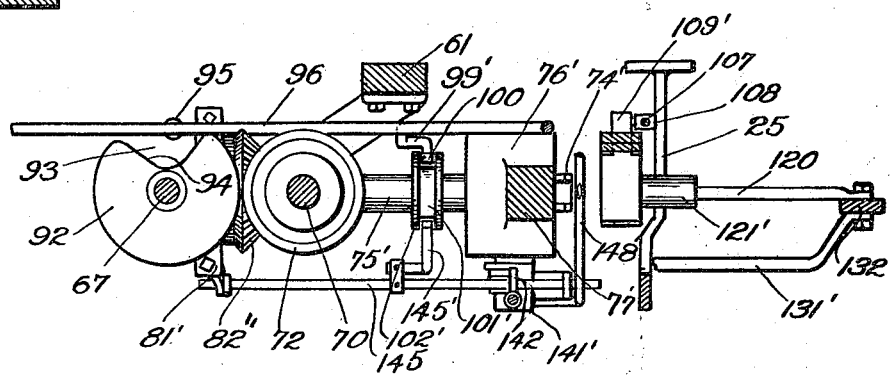
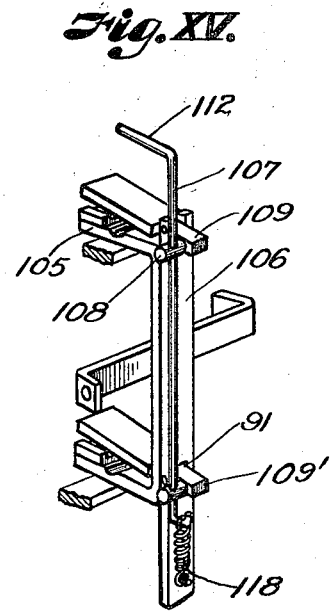
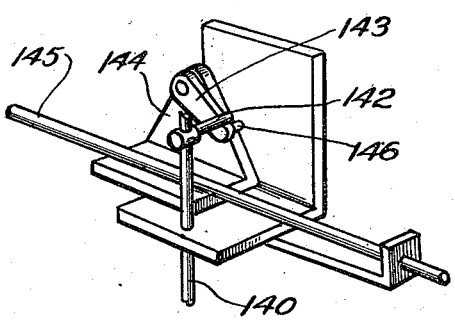

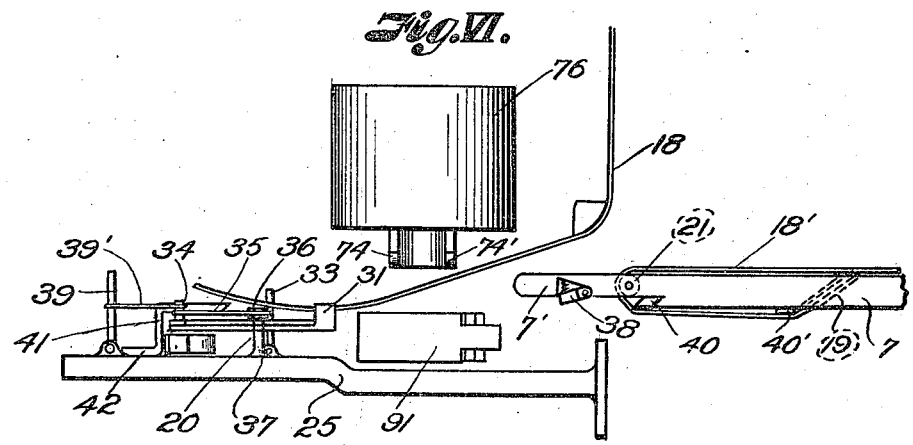
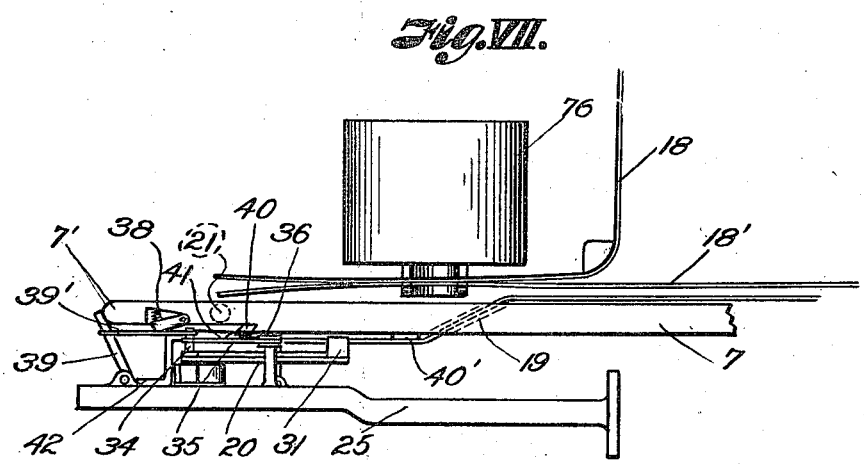
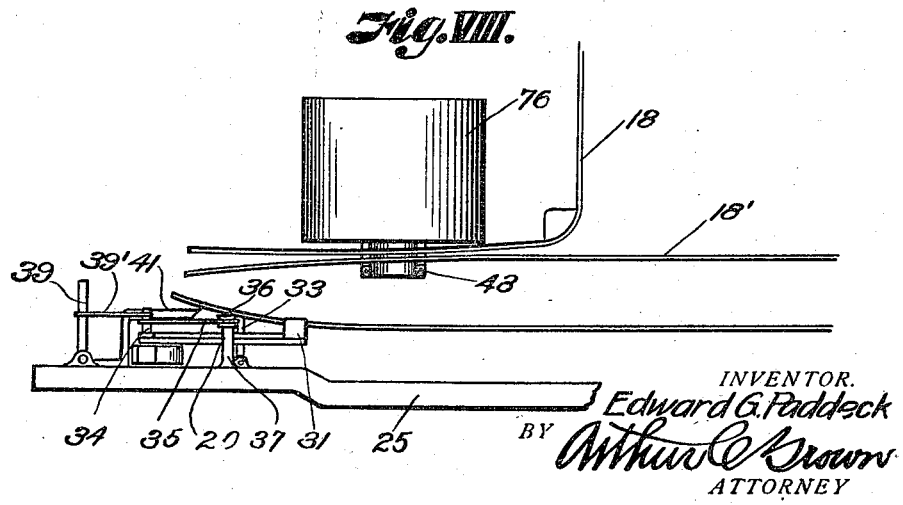

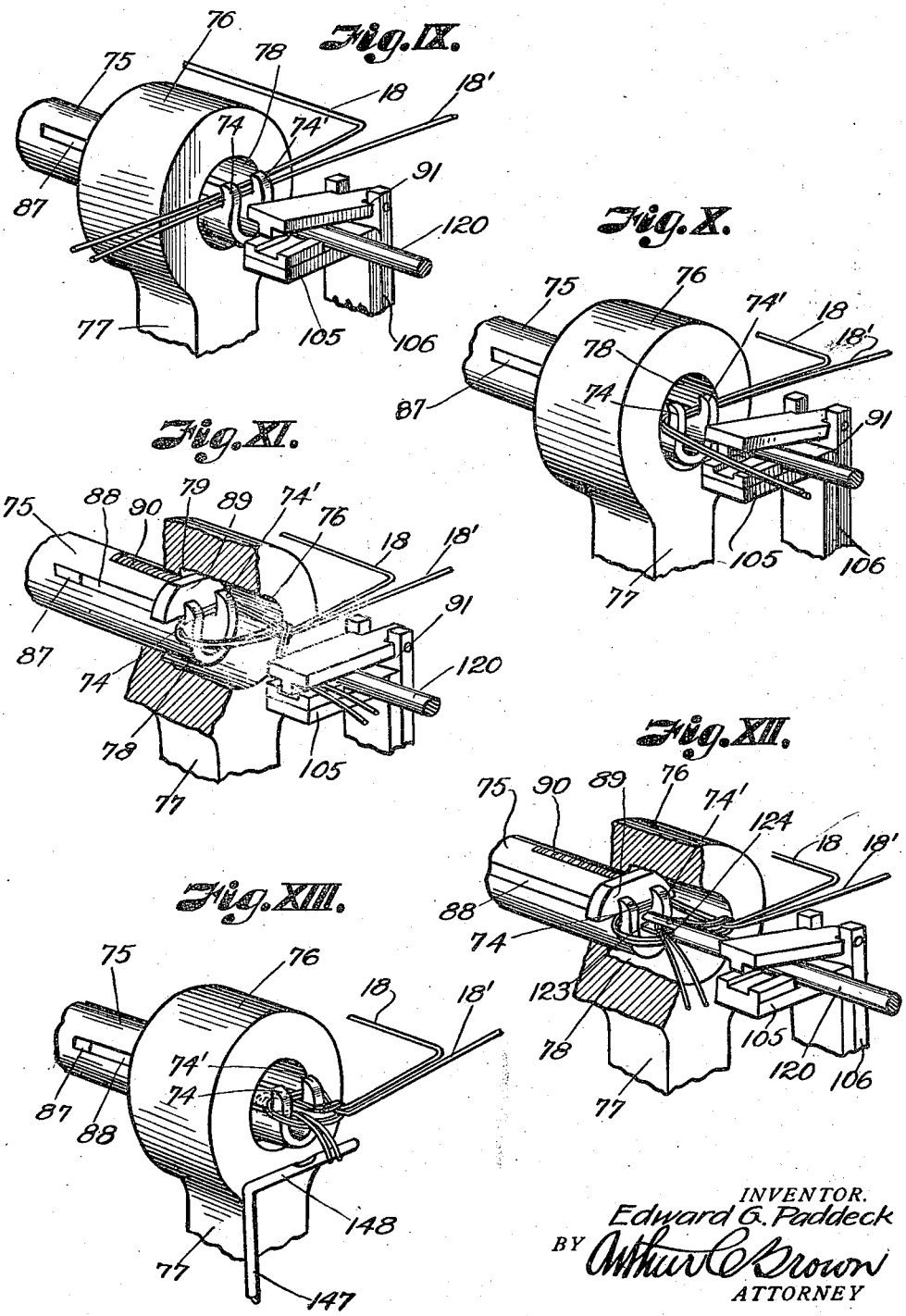

UNITED STATES PATENT OFFICE.

EDWARD G. PADDECK, OF KANSAS CITY, KANSAS.

WIRE-TYING MECHANISM FOR BALING-PRESSES.

1,275,296.   Specification of Letters Patent.   Patented Aug. 13, 1918.

Application filed July 21, 1917. Serial No. 182,053.

*To all whom it may concern:*

Be it known that I, EDWARD G. PADDECK, a citizen of the United States, residing at Kansas City, in the county of Wyandotte and State of Kansas, have invented certain new and useful Improvements in Wire-Tying Mechanism for Baling-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to wire tying mechanism and has for its principal object to provide a mechanism of this character for tying bales of hay, straw, or other material, automatically during the baling process.

In accomplishing this object, I employ mechanism comprising a pair of needles for running wires transversely through the baling case of a press and clutch mechanism for holding the wires across the path of an on coming bale so that as the bale is pushed forward the wires are fed to inclose the bale. Mechanism operating under the influence of the traveling bale actuates the needles at proper intervals relative to the desired length of the bale, and other mechanism is provided for cutting the wires and for knotting the ends to tie the wires about the bale.

The preferred form of mechanism for accomplishing the above and other objects of the invention are illustrated in the accompanying drawings, wherein:

Figure I is a plan view of a part of a baling press equipped with tying mechanism constructed according to the present invention, showing the needles in projected position.

Fig. II is an enlarged side view of the wire tying mechanism.

Fig. III is a back view of the mechanism shown in Fig. II, some of the parts being shown in section for better illustration.

Fig. IV is a horizontal, sectional view of the mechanism on the line IV—IV, Fig. II.

Fig. V is a similar section on the line V—V, Fig. II.

Fig. VI is a plan view of one set of wire tying parts showing the initial wire strand held in a clutch mechanism and the needle advancing with the secondary strand to inclose the wire about the bale.

Fig. VII is a similar view showing the needle in its advanced position, the wire cut, with one end of the cut wire held in the clamp and the other end moved with the primary strand into a tying clutch.

Fig. VIII shows the needles withdrawn, the bale inclosed and a wire drawn across the baling case to receive the end of an oncoming bale.

Fig. IX is a detail perspective view showing the ends of the baling wires located in the sleeve hooks at the start of the tying operation.

Fig. X is a similar view showing the bending of the wires as the sleeve moves inwardly to throw the ends of the wires outwardly between the clamp jaws.

Fig. XI shows the ends of the wires held in the clamp and a loop formed by one revolution of the sleeve.

Fig. XII shows a needle projecting the ends of the wires through the loop to complete the knot.

Fig. XIII shows the knot formed and the finger for removing the knotted ends from the sleeve hooks.

Fig. XIV is a detail perspective view of the clutch mechanism operable by the needles for holding the ends of the baling wires.

Fig. XV is a detail perspective view of the clamps for holding the ends of the wires during a knot forming operation.

Fig. XVI is a detail perspective view of a sliding trip device which operates the mechanism for lifting the knots from the sleeve hooks.

Fig. XVII is a detail perspective view of the end of one of the needles showing the manner of threading the wire therethrough.

Referring more in detail to the drawings:

1 designates the baling case of a hay, straw, cotton or other baling press of ordinary construction, comprising a hopper opening 2 through which the material to be baled is fed into the press, and a plunger 3, whereby the material is compressed and forced through the baling case to form the bales and to induce a forward feed for operating the needles and tying mechanism.

The usual method of baling hay or the like, in a press of this character consists in extending wires transversely through the case to inclose the bale as it is formed and tying the ends of the wires by hand. The present apparatus, however, affects the placing of the wires about the bales, and the tying of the ends thereof automatically by means of needles for carrying the wires through the case, clutches for holding the ends of the wires about the bale during its formation and mechanism for knotting the ends of the wires; all the parts operating at proper intervals to form bales of uniform size.

The needle mechanism comprises a pair of arms 5, which are pivotally mounted at their butt ends on studs 6 at the top and bottom of the baling case 1 and at their forward ends have inwardly extending points 7 curved radially with the pivot point of the arms as a center and are of such length that they may extend entirely through and beyond the side of the case opposite that which they enter.

Mechanism employed for reciprocating the needles to carry the wires through the case may be of various construction, but preferably comprises a shuttle mechanism indicated at 8, and described in my co-pending application on "Automatic Wire Tire for Baling Press," Serial No. 83,950, wherein a shuttle is operated by suitable gearing 9, driven by the advancing movement of a bale through the press case and in turn operates drums 10 to wind or unwind cables 11 therefrom to intermittently reciprocate the needles to carry the wires transversely through the case.

The tie wires for the bales are carried on spools 15 on a shaft 16 supported by plates 17, mounted on the case and carry upper and lower strands of the wire 18, which are extended forwardly to the needle points 7 and are threaded from the inner face thereof through forwardly inclined apertures 19 therein and transversely through the case where they are held by clutch mechanism 20, hereinafter described in detail, to receive the forward end of an on coming bale.

While I employ two needle points for carrying the separate wire strands, so that the bales may be tied adjacent the top and bottom of the bales, the mechanism for tying the wires received from each needle point is identical with that of the other, so but one set will be described in detail with the understanding that the description relates equally to both.

When a wire 18 is drawn from a spool 15 and threaded through a needle point aperture it is then caught by a clutch 20 and held therein so that when the needle point moves outwardly from the case, the wire is held and lies horizontally across the baling case. With the wire so held, when the hay, or other material to be baled, is forced forwardly through the case it engages the wire and as one end of the wire is held in the clutch and cannot give, but being free on the spool, will unwind therefrom and slip through the aperture 19 and over a grooved wheel 21 mounted in the needle point, so that prior to the operation of the needle, the forward end and both sides of the bale are inclosed by the wires; it being apparent that when the bale is of sufficient length the needle may be actuated to carry the wire back of the bale to locate the strands in tying position so that the ends may be joined to hold the bale intact.

The clutch mechanism 20, which holds the initial end of the strands for inclosing the bales, is carried by a bracket 25 mounted on and extending perpendicularly from the side wall of the baling case (Figs. VI—VII—VIII—XIV), and comprises a double set of lazy-tong links 26—26', 27—27'; the links 26—26' being pivotally mounted in crossed relation on a pivot pin 28" while the outer ends of the links 27—27' are pivotally connected with the outer ends of arms 28—28' extending from a pair of meshing gear members 29—29', which are revolubly carried on the bracket 25. Corresponding ends of the links are pivotally connected, as at 30, so that spreading or closing of the free ends of the links 27—27' will similarly actuate the free ends of the links 26—26'.

At their inner ends the links 26—26' are provided with outstanding jaws 31—31' which close together and open apart under influence of the links 27—27', so that when a wire is brought therebetween, as shown in Fig. VII, the jaws may be closed thereon to hold the wire as the needle withdraws.

Pivotally mounted on the bracket 25, and extending outwardly therefrom with its free end terminating in the path of the wire carrying needle 7, is a lever 33, and attached thereto and to a pin 34 extending from the end of a link 27 is a cable 35 which runs over a roller 36 mounted on a pin 37 in such a manner that a spring pressed latch 38, mounted on the needle will engage the lever as the needle passes through the case and will rock the latter forwardly to tension the cable 35 and open the free ends of the links 27—27' and similarly move the jaws 31—31' apart to permit the wire extending along the face of the needle to pass therein.

At the forward end of the bracket 25 is a pivotally mounted lever 39, which extends outwardly in the path of the needle and which is adapted to also be engaged by the needle as it nears its outer limit and attached thereto and to the pin 34 is a cable 39', whereby engagement of the lever 39 by the needle will tension the cable to so move the links that the jaws 31—31' will be closed against the wire carried by the needle to hold the free end of the strand after that part of the wire inclosing the bale has been severed therefrom.

In order to facilitate clutching of the wire, I space the latter from the face of the needle by passing the wire over a cutting blade 40 near the end of the needle, and an outstanding block 40' fixed to the face of the needle near the aperture 19 so that the needle passes the clutch, the jaws close together and an effective grip on the wire is accomplished.

When threading the machine at the start of a baling operation, the primary strand 18 is threaded through the aperture 19, the needle being in its outer position (dotted lines Fig. I), and is drawn transversely through the baling case and secured in the jaws 31—31' so that the transverse strand will be caught by an on coming bale.

As the bale is formed the wire is paid out from the spool 15 as needed and when the bale has reached a determined length the needle is actuated to draw the secondary strand 18' about the bale. As the needle moves forwardly the latch 38 thereon engages the lever 33, which, by the cable connection with the tongs 27, opens the jaws 31—31' apart to release the primary strand and to receive the secondary strand. Continued forward movement of the needle brings the end 7' into contact with the lever 39 and the latter is moved outwardly tensioning the cable 39' to close the tongs together and clamp the jaws about the secondary strand just back of the cutting blade.

Final forward movement of the needle brings the cutting blade 40 thereon over which the strand 18' is drawn into contact with a coöperating blade 41 carried by a bracket 42 fixed to the outer end of the bracket 25 so that the strand is severed. Following the severance of the strand the needle moves outwardly from the case and as the clutch holds the end of the wire, the latter is drawn through the needle aperture and lies across the baling case to be advanced by the end of an on coming bale; the ends of the primary strand and severed secondary strand being dropped back of a sleeve head 43 (Fig. VIII) on the tying mechanism presently described.

The operation of feeding and clamping the wires has been the same for the upper and lower strands and the strands are tied together by duplicate sets of mechanism 8, previously mentioned.

After the needle has thus inclosed the bale, the next operation is to tie together the ends of the inclosing strands. The tying mechanism is operated by the final movement of the shuttle through a shaft 50 which extends across the case and on the tying side is supported revolubly in a bearing 51 fixed to the frame 1. At the end of the shaft is a bevel gear wheel 52, and fixed on one end of a shaft 53 carried in an arm 55 extending from the bearing 51, is a gear wheel 54 meshing with the gear wheel 52. The opposite end of the shaft 53 carries an oppositely facing bevel gear wheel 56, which meshes with a bevel gear wheel 57 carried at the upper end of the main tying mechanism driving shaft 58 that is revolubly carried in upper and lower frame members 59—60 that are connected by cross bars 61 upon which the mechanism is carried and attached to the baling frame, the frame being so located that the parts carried thereby will be located in coöperative relation with the needles and wire clutches.

Fixed to the shaft 58 is a spur gear wheel 65, which meshes with a larger gear wheel 66 fixed on a shaft 67, revolubly carried vertically by the frame members 59—60 and fixed to the shaft adjacent its lower end is a gear sector 68, which is adapted to mesh intermittently as the shaft 58 revolves with a gear wheel 69 that is fixed on a shaft 70 (Fig. III), that is revolubly mounted in the frame member 60 and has oppositely facing bevel gear wheels 71—72 fixed to its opposite ends which synchronously operate the duplicate sets of tying mechanism; the gear wheel 69 is here shown integrally formed with the gear wheel 71 and the oppositely facing gear wheels are fixed to the shaft to abut opposite faces of the frame members 60 which prevents any possible displacement.

As before stated, when the needles move outwardly from the case, the free ends of the wire strands inclosing the bale drop back of the spaced upwardly extending hooks 74—74' at the ends of the turning sleeves 75. The said sleeves 75 are formed of short lengths of tubing and are longitudinally slidable and revolubly supported adjacent the hooked ends in bearings 76—76' formed at the upper and lower ends of arms 77—77' extending oppositely from the frame bar 60; the said bearing portions being provided with rearwardly opening sockets 78—78' forming annular channels 79—79' about the sleeves and within which the hooked ends of the sleeves may be moved during a tying process.

Supported from the frame at a spaced distance from the bearings 76—76' are bearing rings 81—81' within which are revolubly keyed upper and lower gear wheels 82—82', which travel in mesh respectively with the gear wheels 71—72 so that as the latter are revolved by actuation of the previously described mechanism the gear wheels 82—82' are likewise revolved.

At their forward ends the tubular sleeves 75—75' extend coaxially through and are slidably keyed within the gear wheels 82—82' so that they may be revolved thereby and at the same time have a longitudinal movement therein.

Each of the sleeves adjacent the forward end has a cutout portion for forming the hooks 74—74', a seat 86 spaced from and facing the hooks and a slot 87 extending forwardly from the seat. Slidably mounted within the slot is a plate 88 having a semicircular head 89 at one end which is urged toward the hooks by a coil spring 90 which seats thereagainst and against the seat 86 and which is adapted to urge the head 89 outwardly to clamp and hold the ends of the baling wires against the hooks as the sleeves are moved inwardly and rotated during the knot forming process.

As the needles are withdrawn from the case leaving the strands inclosing a bale seated back of the sleeve hooks, a movement of the shuttle mechanism following that which operates the needles revolves the shaft 50 so as to actuate the tying parts; the tying operation in each instance following after each intermittent movement of the needles.

The first movement of the mechanism to perform the knotting of the strands together is the inward movement of the sleeves 75 which draws the ends of the strands within the bearing sockets and presses the clamp heads 89 against the hooks 74 to hold the strands tightly within the clamp and simultaneously bends the free ends of the strands outwardly (Fig. X), so that they are moved between the open jaws of a clamp mechanism 91, presently described, wherein they are held while the knot loop is being formed.

The mechanism employed for longitudinally shifting the sleeves comprises a cam wheel 92, that is fixed to the lower end of the shaft 67 and has a notch 93 therein forming a forwardly facing cam surface 94, adapted to engage a roller 95 revolubly mounted on a bar 96 slidably mounted in the frame member, to move the bar longitudinally along the frame.

Fixed to the slide bar 96 and also slidable in the frame members are arms 97—98, provided at their ends with yoke heads 99—99' carrying rollers 100 thereon, which travel within annular channels 101 in head members 102, fixed in the inner ends of the sleeves in such a manner that shifting of the slide bar 96 will correspondingly move the sleeve, while at the same time the sleeves are permitted to be rotated under influence of the gear wheels 82—82'.

The cam wheel 92 is so fixed on the shaft 67, relative to the gear sector 68, that the inward movement of the sleeves is completed just as the sector moves into mesh with the gear wheel.

The clamp mechanism 91, whereby the ends of the strands are held during a portion of the knot forming operation, comprises upper and lower sets of jaws, the lower jaw 105 of each set being fixed to a vertical bar 106 that is suitably mounted on the mechanism while the upper jaws are hingedly mounted and are adapted to open and close against the fixed jaws.

Means for actuating the upper jaws comprise a shift rod 107, which is fixed to pins 108 pivotally mounted in and extending laterally from neck portions 109—109' extended beyond the pivot point of the jaws, so that downward movement of the rod 107 will open the jaws and its upward movement will likewise close the jaws together.

Pivotally mounted on the bearing 76 is a bell crank lever 110, having a horizontal extending arm 111 adapted to be moved into engagement with the outturned upper end 112 of the jaw controlling rod 107, and has a vertical arm 112' pivotally connected with one end of a link 113 slidable at its opposite end in a bearing 114 at the forward end of the mechanism frame.

Fixed on the link 113 is a roller 115, which is adapted to be engaged by a cam face 116 of a cam wheel 117, fixed to the shaft 67 above the gear wheel 66, so that as the shaft revolves the link 113 will be intermittently moved forwardly to clamp the jaws together; the cam wheel 117 is located in such position that the jaws are operated in proper sequence relative to the movement of the sleeves to properly perform their function.

After the link 113 has been actuated by the cam 117 to close the jaws and the cam has moved sufficiently to release the roller 115, the parts are moved back to initial position under the influence of a coil spring 118, which is attached to the lower end of the rod 107, and to the frame, to normally hold the jaws in open position.

Assuming that the sleeves have moved inwardly, drawing the ends of the strands within the sockets and that the ends of the strands are bent outwardly as they are drawn into the socket and are thereby moved into a pair of clamp jaws and the latter have been closed thereon to hold the same, the gear sector 68 at this instant moves into contact with the gear wheel 69 and revolves the same once around which, through the meshing gear wheels 71 and 82, revolves the sleeves 75 once over, thereby forming a loop in that portion of the wire held within the socket as is shown in Fig. XI.

After this loop has been formed the cam wheel 117 moves to such position that the link 113 is released and the jaws, under the influence of the spring 118, are opened to release the ends of the strands.

After the ends have thus been released the knot is completed by pushing the ends through the loop. This is accomplished in each set of tying parts by needles 120, slidably mounted in bearings 121—121', fixed on the frame bar 106 and which are adapted to be moved between the clamp jaws and centrally into the open ends of the sleeves.

At the inner end of each needle is a mouth 123 and mounted therein is a roller 124; the mouth being so located that as the needles move inwardly the freed ends of the strand will pass into the mouth (Fig. XII), and as the needle continues to move inwardly the ends of the wires are pushed into the loop (Fig. XIII) to tie the wires together in the form of a single bow knot.

The mechanism for actuating the needle 120 comprises a slidably mounted shift rod 130, having bifurcated end portions 131—131' fixed to a cross head 132 connecting the outer ends of the needles. Adjacent its forward end the rod 130 has a pin 133 projecting therefrom which is adapted to be engaged in proper sequence by an arm 134 extending from a shaft 135 revolubly carried by the frame and operated by a gear wheel 136 fixed thereon and traveling in mesh with the gear wheel 65, so that the needles will be moved inwardly. When the pin has been released by the arms the rod 130 and needles are moved back to normal position under the influence of a coil spring 137 that is fixed at one end of the rod 130 at its opposite end to the frame bar 60'.

After the knot has been thus formed the movements of the cam wheel 92 allow the sleeve shifting mechanism to be moved rearwardly under the tension of a spring 138, so that the hooked ends of the sleeves are again extended from the bearings (Fig. XIII). At this time the loops are pushed from the sleeve hooks and the pressure of the material in the bale against the wires draws the knot tight.

The means employed for lifting the loops from the sleeve hooks comprises a lift bar 140, which is slidably mounted in a vertical position in bearing plates 141—141', fixed to the bearings 76—76' and extending therefrom is a lift pin 142, adapted to engage an inclined face of a pivotally mounted arm 143 carried by a slide plate 144; the plate being adapted to be moved horizontally back and forth by a shift rod 145, so that at proper intervals the arm 143 is brought into engagement with the pin 142 so that the pin travels thereover to lift the bar, the arm is limited in its downward movement and is held in an inclined position by a short stud 146, extended from the face thereof to engage the edge of the slide plate on the return movement of the slide the arm is permitted to move upwardly to allow the pin to pass thereunder.

The shift rod 145 is reciprocated by means of an arm 145' attached thereto and having an end slidable in the channel 101' of the collar 102' that is fixed on the sleeve 75'.

Extending from the lift rod are arms 147—147', each having a horizontal end portion 148—148' which is adapted as the lift rod is moved upwardly to engage the under portion of the loop to lift the same from the sleeve hooks.

Briefly describing the operation of the apparatus as applied to a hay baler, the wires on the storage spools 15 are threaded through the needle points, run across the compression case and are secured in the clutches at the upper and lower positions relative to the bale.

Hay is then fed into the press through the hopper and is forced forwardly by the plunger, the compression case retarding movement of the hay so that it is compact while being formed. As the bale grows and moves forwardly it operates the shuttle mechanism to drive the needles transversely across and back of the base, the wires are located transversely of the baling chamber and in the path of a bale, the wires have been drawn out by the bale being pushed thereagainst so that they inclose both sides and front end thereof.

As the needle is driven across the baling case, it carries the wires that are to inclose the rear end of the bale and on its final movement releases the end of the primary strand from the clutches, brings the cutting blades together to sever the secondary from the primary strand, releases the primary strand from the clutch, moves the ends of the bale, inclosing wires back of sleeve hooks and again clamps the clutch parts over the end of the secondary strand to hold the latter as the needle is withdrawn.

As the end of the secondary strand has been gripped as described, the ends of the wires are held so that they form strands across the baling chamber against which an on coming bale may abut; the former end strands being held by the sleeve hooks 74—74'.

After the needles are withdrawn from the case, the gear mechanism revolves the shaft 67 and cam wheel 92, to move the sleeves inwardly into the socket 78 and thereby bend the ends of the wires rearwardly (Fig. X), and throwing the same between the clamp jaws.

The jaws are then actuated by the upward movement of the lift rod 107 operated by the lever 110, link 113 and cam wheel 117, to close against the ends of the wire to hold the same during the looping operation.

Following the clamping of the jaws over the ends of the strands the gear sector 68 moves into mesh with the gear wheel 69 and through the gear 71 and 72 revolves the sleeves once around forming a loop as is shown in Fig. XI.

The jaws then releases the ends of the strands and the needles 120 move inwardly catching the released ends of the strands and carry the same through the loops, (Figs. XII—XIII). After the needles 120 are withdrawn, the sleeves 75 return to initial position, the lift rod 140 is actuated to lift the loops from the hooks 74 and 74', the knot is then drawn tight as the pressure of the baled material draws the strands tight.

At the completion of each tying operation the parts are returned to initial position and ready for a successive operation so that a new bale may be formed, the operation being continuous and hay may be fed into the press without interruption.

Having thus described my invention, what I claim as new therein and desire to secure by Letters-Patent, is:

1. The combination with a baling case, a means at one side of the case for holding a primary wire strand, a guide movable from the opposite side of the case to carry a secondary wire strand adjacent the held strand, a clamp for receiving the two strands, means for actuating the clamp to loop the clamped portions of the strands, and means for projecting the ends of the strands through the loop to form a knot.

2. The combination with a baling case, a means at one side of the case for holding a primary wire strand, a guide movable from the opposite side of the case to carry a secondary wire strand adjacent the held strand, a clamp for receiving the two strands, means for actuating the clamp to loop the clamped portions of the strands, means for projecting the ends of the strands through the loop to form a knot, and means for removing the knot from the clamp.

3. The combination with a baling case, of a wire clutch at one side of the case, for holding the primary end of a wire strand, a needle at the opposite side of the case for carrying a secondary part of the wire along the part held in the clutch, means for actuating the needle and means on the needle for actuating the clutch to release the primary strand and for severing the secondary strand, a clamp adapted to clutch and loop the released ends of the strands to form a knot.

4. The combination with a baling case having means at one side thereof for carrying baling strands transversely through the case, of a tying mechanism comprising a revoluble sleeve having means for gripping the ends of the baling strands, means for revolving the sleeve to form a loop in the strands and a needle for projecting a portion of the strands through the loop to form a knot.

5. The combination with a baling case having means at one side thereof for carrying baling strands transversely through the case, of a revoluble sleeve, a clutch on the sleeve for holding the ends of the strands, gears operable by a prime mover for revolving the sleeve to form a loop in the held portions, a needle adapted to project a portion of the strands through the loop to form a knot and a lift member for removing the knot from the sleeve clutch.

6. The combination with a baling case having a needle at one side thereof for carrying a baling strand transversely through the case, of wire tying mechanism comprising a clutch at the side of the case opposite the needle for holding the primary end of a wire strand, means for actuating the needle to carry a secondary part of the wire along the primary strand, a revoluble sleeve, means operable by the needle for releasing the primary strand and for severing the secondary portion thereof, a clutch at the end of said sleeve for gripping the released strands, gears operable by a prime mover for revolving the sleeve to form a loop in the gripped portions, a clutch for gripping the ends of the strands as the sleeves revolve to hold the same across the loop, means for opening the clutch to release the ends after the loop has been formed and a needle adapted for projection into the sleeve to carry the released ends through the loop to form a knot.

7. The combination with a baling case having a needle at one side thereof for carrying a baling strand transversely through the case, a wire tying mechanism comprising a clutch at the side of the case opposite the needle for holding the primary end of a wire strand, means for actuating the needle to carry a secondary part of the wire along the primary strand, a revolubly mounted and longitudinally movable sleeve having spaced hooks at its end, means operable by contact of the needle for releasing the primary strand and for severing the secondary strand and for moving the released ends back of said sleeve hooks, means for moving the sleeve longitudinally to bend the ends of the strands outwardly, a clutch for receiving the outturned ends of the strands, gearing for revolving the sleeve to form a loop in the strands, a needle operating within the sleeve to project the ends of the strands through the loop to form a knot and a lift bar operating after formation of the knot to lift the latter from the sleeve hooks.

8. In a wire tying mechanism of the character described, a bearing having a socket at one side, a sleeve revolubly mounted in the bearing and longitudinally slidable therein; the said socket forming an annular channel about the sleeve, spaced hooks at the end of said sleeve, a block yieldingly urged against said hooks to form a clutch, means for placing baling strands in said clutch and means for moving the sleeve longitudinally within the pocket and for revolving the same, for the purpose.

9. The combination with a baling case having a needle on one side for carrying baling strands transversely through the case, of wire tying mechanism comprising a clutch mechanism at the side of the case opposite the needle for gripping the primary end of a baling strand, means for actuating the needle to carry a secondary part of the strand along the end of the primary strand, a bearing member having a socket at one side, a sleeve revolubly mounted and longitudinally movable in said bearing and having spaced hooks at its end extending from said bearing socket; said socket forming a channel about the sleeve, means operable by contact of the needle for releasing the primary strand and for severing the secondary strand and for moving the released ends back of said sleeve hooks, mechanism for moving the hooked end of the sleeve within the socket to bend the ends of the strands outwardly, a clutch for gripping the outturned ends of the strands, mechanism for revolving the sleeve to form a loop in the strands, a needle for projecting the ends of the strands through the loop to form a knot and a lift member for removing the knot from the sleeve hooks.

In testimony whereof I affix my signature.

EDWARD G. PADDECK.

Copies of this patent may be obtained for five cents each, by addressing the "Commissioner of Patents, Washington, D. C."